United States Patent
Centonze et al.

(10) Patent No.: US 8,572,727 B2
(45) Date of Patent: Oct. 29, 2013

(54) SYSTEM, METHOD AND APPARATUS FOR SIMULTANEOUS DEFINITION AND ENFORCEMENT OF ACCESS-CONTROL AND INTEGRITY POLICIES

(75) Inventors: Paolina Centonze, Amawalk, NY (US); Yinnon Avraham Haviv, Beerotaim (IL); Roee Hay, Haifa (IL); Marco Pistoia, Amawalk, NY (US); Adi Sharabani, Ramat Gan (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 12/624,172

(22) Filed: Nov. 23, 2009

(65) Prior Publication Data

US 2011/0126282 A1  May 26, 2011

(51) Int. Cl.
*G06F 21/00*  (2013.01)

(52) U.S. Cl.
USPC ............. 726/21; 713/155; 713/156; 713/157; 713/158; 713/159

(58) Field of Classification Search
USPC ............................................ 726/21; 380/185
See application file for complete search history.

(56) References Cited

U.S. PATENT DOCUMENTS

| | | | | |
|---|---|---|---|---|
| 6,044,466 A | * | 3/2000 | Anand et al. | 726/1 |
| 7,076,557 B1 | | 7/2006 | Lamacchia et al. | |
| 2006/0230282 A1 | * | 10/2006 | Hausler | 713/182 |
| 2007/0277222 A1 | * | 11/2007 | Pouliot | 726/1 |
| 2008/0072282 A1 | * | 3/2008 | Willis et al. | 726/1 |
| 2008/0127113 A1 | * | 5/2008 | Wu et al. | 717/129 |

OTHER PUBLICATIONS

International Search Report Mailed Nov. 12, 2010 in corresponding International Patent Application No. PCT/US10/48797.

* cited by examiner

*Primary Examiner* — Ghazal Shehni
(74) *Attorney, Agent, or Firm* — August Law, LLC; George Willinghan

(57) ABSTRACT

Access-control and information-flow integrity policies are enforced in a computing system by detecting security-sensitive sinks in software code for an application running on the computing system and retrieving an access-control policy from a database accessible to the computing system. The access-control policy maps a set of access permissions within the computing system to each one of a plurality of principals. For each detected security-sensitive sink, all principals that influence that security-sensitive sink are detected and an overall access permission is assigned to each security-sensitive sink by taking the intersection of the access permission sets for all influencing principals of that security-sensitive sink. If this permission set is inadequate, an integrity violation is reported. In addition, permission labels are assigned to each value of variables used in the security-sensitive sinks. Each permission label is a set of permissions.

25 Claims, 4 Drawing Sheets

SBAC Static and Dynamic Permissions

Problems with SBAC

Problems with HBAC

SYSTEM, METHOD AND APPARATUS FOR SIMULTANEOUS DEFINITION AND ENFORCEMENT OF ACCESS-CONTROL AND INTEGRITY POLICIES

FIELD OF THE INVENTION

The present invention relates to access-control and information-flow integrity policies in computing systems.

BACKGROUND OF THE INVENTION

Modern programming run-time environments, such a Java and the Microsoft .NET Common Language Runtime (CLR), offer an architecture for defining and enforcing access-control policies. The run-time environments have a list of pre-defined protected resources. Such a list can be extended by individual system administrators. Each protected resource is guarded by a permission at run time. When a protected resource is about to be accessed, a special component in the runtime, AccessController.checkPermission in Java and Demand in the CLR, is invoked. This component is the "access-control enforcer". The access-control enforcer, when invoked on a particular resource, traverses the stack of execution and verifies that all the callers on the stack have been granted enough permissions to access the protected resource.

There is a major problem with this approach. The access-control policy is not properly enforced since the access-control enforcer only traverses the current stack of execution, demanding the principals, i.e., users or program components, on the stack exhibit the necessary permission. However, this stack traversal does not capture codes or subjects that have influenced the security-sensitive operation, for example, the name of a file being modified, unless those codes or subjects are still active on the stack. This may not be the case since code may have been popped out of its stack, but its influence may have been recorded in the heap or passed as a return value from a method that is no longer on the current stack of execution, and used for security-sensitive operations.

On the other hand, there are many systems where it is necessary to define and enforce information-flow integrity policies. In information-flow policies, the goal is to prevent untrusted principals from influencing trusted operations. A typical example of a system where integrity enforcement is essential is a Web application server. For Web applications, which constantly receive untrusted inputs from potentially untrusted users, it is very important to verify those inputs before using them in security-sensitive operations. There are two problems with these integrity policies. The first is that they are difficult to define, since a system administrator often does not know where the untrusted inputs come from and flow to. Second, they are difficult to enforce since proper enforcement requires detecting all the sources of influence and tracking those influences until a value is used.

Another difficulty is detecting implicit flows of information. In an implicit flow, an attacker does not directly modify or define the data that will be used in a security-sensitive operation. Rather, the attacker influences which data will be used.

SUMMARY OF THE INVENTION

Exemplary embodiments of the present invention integrate access-control and information-flow integrity policy definition and enforcement. In accordance with one exemplary embodiment, the present invention is directed to a method for enforcement of access-control and integrity policies in a computing system. In accordance with this method security-sensitive sinks are detected in software code for an application running on the computing system. In one embodiment, detecting the security-sensitive sinks includes using program analysis on the software code, which includes using static program analysis on the code and underlying libraries. In one embodiment, detecting security-sensitive sinks includes analyzing the software code and identifying calls in the software code to an access-control enforcer in the computing system. In one embodiment, the access-control enforcer enforces the access-control policy.

The method also includes retrieving an access-control policy from a database accessible to the computing system. The access-control policy maps a set of access permissions within the computing system to each one of a plurality of principals. In one embodiment, the access-control policy is declaratively defined separately from the software code. For each detected security-sensitive sink, all principals that influence that security-sensitive sink are determine, and an overall access permission is assigned to each security-sensitive-sink by taking the intersection of the access-permission sets for all influencing principals of that security-sensitive sink. An integrity violation is reported when an overall access permission for a given security-sensitive-sink is insufficient to satisfy a demanded permission from a resource within the computing system. In one embodiment, each access permission contains a set of security-sensitive operations within the computing system that has been granted to a principal. Each principal is an entity interacting with the computer system whose identify can be verified by authentication and is granted privileges through authorization. In one embodiment, the plurality of principals includes user principals, machine principals or service principals.

In one embodiment, the method of the present invention also includes identifying variables used in the security-sensitive sinks, each variable having a value that can be influenced by one or more principals and assigning a permission label to each value of each variable. Each permission label includes a set of permissions granted to that value. In one embodiment, assigning the permission label occurs at run time of the software code for the application running on the computing system. In one embodiment, the set of permissions of each permission label is derived from the sets of permissions mapped to principals influencing the value associated with that permission label.

In one embodiment, the method of the present invention also includes detecting a new value created from two or more existing values and calculating a permission label for the new value using the intersection of the sets of permissions associated with each value used to create the new value and the principal defining the new value. In one embodiment, assigning the permission label also includes using the permission label for any value controlling a conditional statement to constrain permission labels for any value defined on the software code dominated by the conditional statement.

Exemplary embodiments of the present invention are also directed to a method for enforcement of access-control and integrity policies in a computing system by detecting security-sensitive sinks in software code for an application running on the computing system, retrieving an access-control policy from a database accessible to the computing system, identifying variables used in the security-sensitive sinks, each variable having a value that can be influenced by one or more principals; assigning a permissions label to each value of each variable, and using the assigned permission labels to make access control decisions for the security-sensitive sinks within the computing system. The access-control policy maps a set of access permissions within the computing system to each one of a plurality of principals, and each permission label includes a set of permissions granted to that value.

In one embodiment, assigning the permission label occurs at run time of the software code for the application running on the computing system. In one embodiment, the set of permissions of each permission label is derived from the sets of permissions mapped to principals influencing the value associated with that permission label. The method also includes detecting a new value created from two or more existing values and calculating a permission label for the new value using the intersection of the sets of permissions associated with each value used to create the new value and the principal defining the new value.

In one embodiment, the step of assigning the permission label also includes using the permission label for any value controlling a conditional statement to constrain permission labels for any value defined on the software code dominated by the conditional statement.

DETAILED DESCRIPTION

Exemplary embodiments of systems and methods in accordance with the present invention provide for the automatic definition of information flow policies in a computing system such as a distributed computing system or a Web-based computing system.

Access-control policies exist for many computing systems. These access-control policies are attached to files, directories or resources and govern access to these files, directories and hardware components, collectively resources, by the principals, i.e., persons using the computing system and applications running on these computing systems, of the computing system. Access control includes authentication and authorization, and one of the goals of access control is to protect the integrity of the resources, e.g., data, being accessed.

An access control system utilizes permissions to control access of resources by users. Permissions are assigned to users. The resources make permission demands from the users. If the permission from a given user satisfies the demanded permission, that user is provided access to that resource. The access control system, however, does not utilize information-flow policies and does not consider how information flows through a computing system. In particular, the access-control system cannot account for multiple actors or multiple principals in a given information flow and for multiple information flows.

In a component-based system, the issue is not just about who executes the code, but who owns the code to be executed, because code providers also are principals involved in the information flow. When access to a restricted resource is attempted, different components with different levels of trust may be involved. The challenge is to verify that all of the components responsible for that security-sensitive access have sufficient rights to access that resource.

Figure 1:
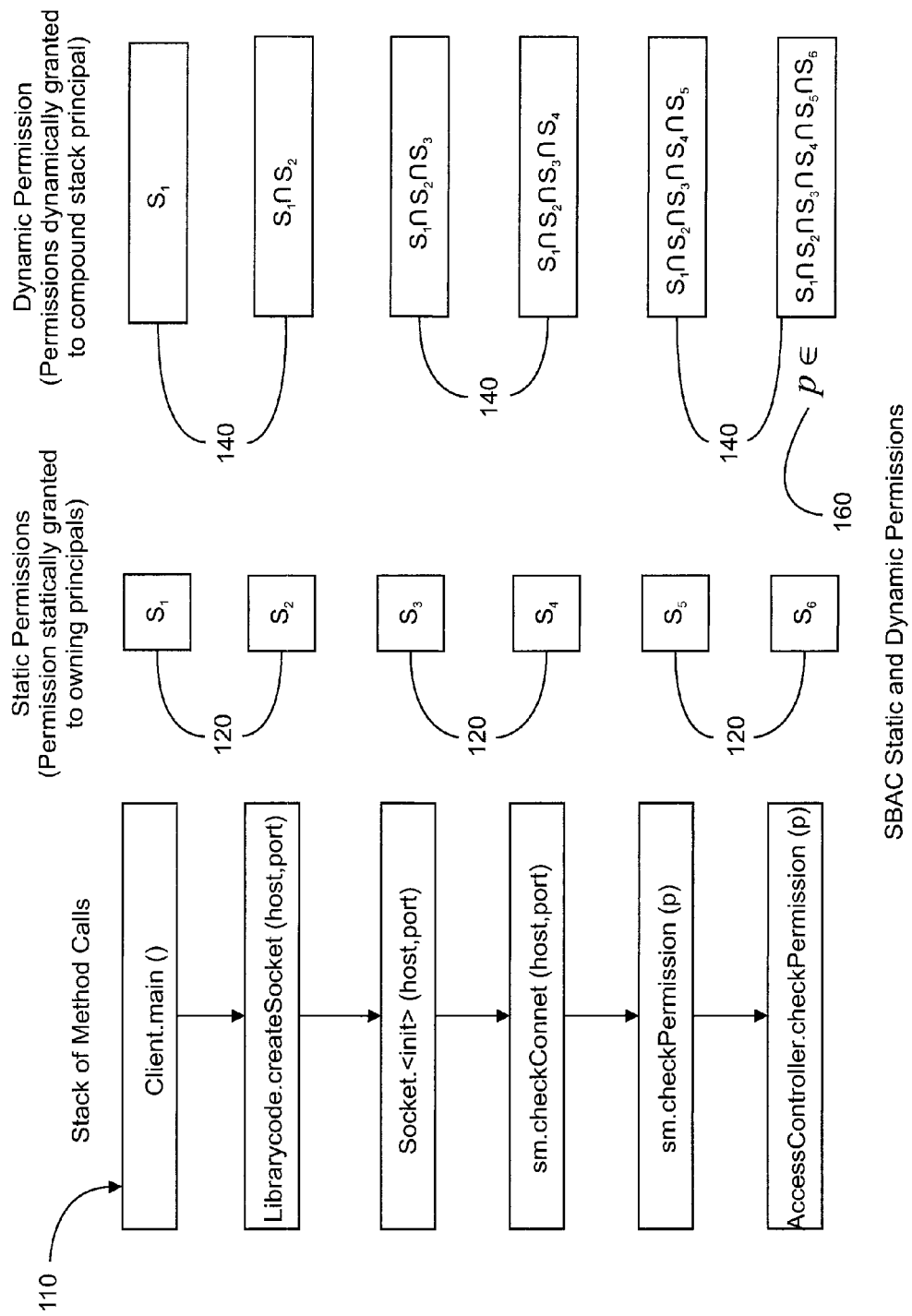
FIG. 1 is a schematic representation of stack based access control.

One attempted solution is stack-based access control (SBAC). Referring to FIG. 1, static and dynamic permissions within a SBAC are illustrated. In a stack of method calls 110, a separate set of static permissions 120 is granted to each owning principal within the stack. These sets of static permissions can overlap, and a dynamic permission 140 is determined for each principal within the stack based on the intersection of the sets of static permissions for that principal and every other principal higher up in the stack. Therefore, the last principal in the stack represents the intersection of all of the static permissions 120, and this represents the overall permission 160 for the stack.

Figure 2:
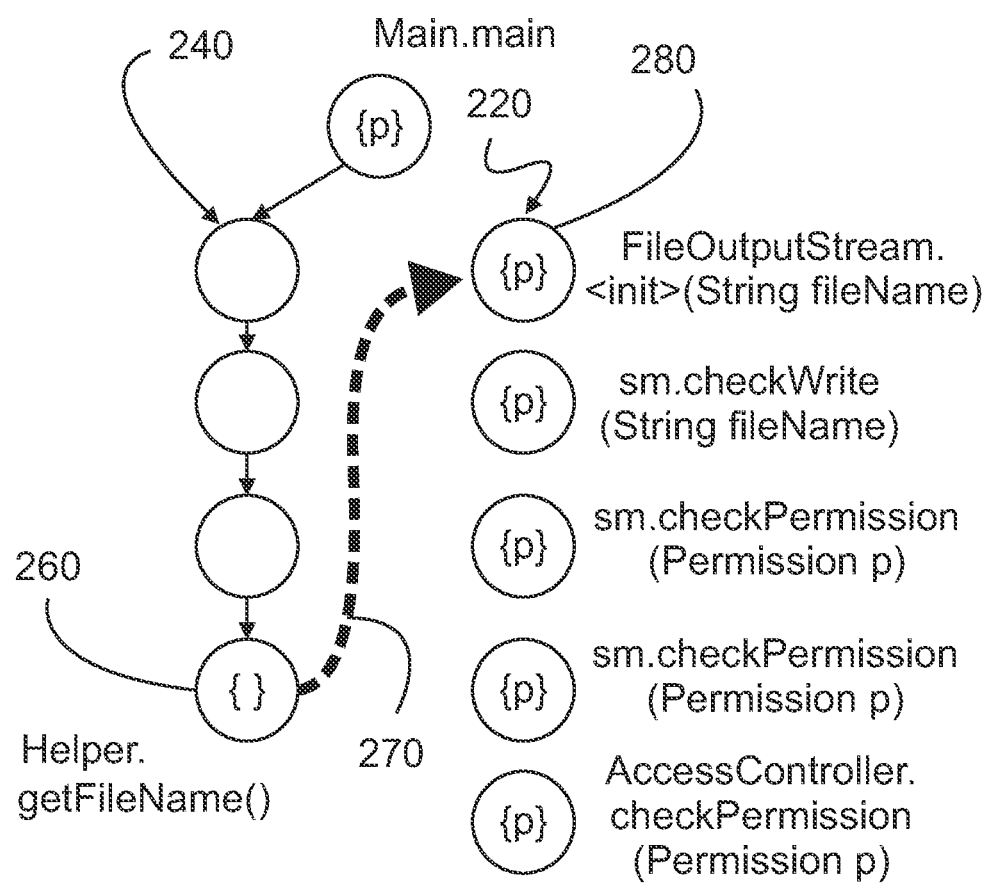
FIG. 2 is a schematic representation illustrating problems with stack based access control.

A special test function is invoked from the trusted application program interface (API) responsible for mediating security-sensitive access in the computing system. All the callers, i.e., principals, on the current stack of execution are checked for permissions, and a compound principal whose access rights are the intersection of the set of access rights or permission of all the principals in the stack is computed. As illustrated in FIG. 2, the authorization decision in SBAC depends solely on the current series 220 of nested calls. Other principals, for example principals in other series 240 of nested calls, are not considered by SBAC. No other kinds of interactions between software components including use of results returned from untrusted code, mutable state, side effects and concurrency are considered. For example, a given principal 260 in another stack 240 may be providing the name of the file 270 to a principal 280 in the stack 220 that is being checked.

The permissions associated with this other principal 260 should be checked. As illustrated, this other principal 260 has an empty set of permissions, and this provides an avenue for an attack that can come through the stack 220 that is being checked. However, SBAC does not check the sets of permissions associated with principals outside the current stack and, therefore, is potentially too permissive.

History-based access control (HBAC) provides a more restrictive access control mechanism that checks the permissions associated with any principal and any code that has ever been executed. Therefore, HBAC is more restrictive than SBAC and in the illustrated example of FIG. 2, would deny access based upon the involvement of the other principal that lacks any associated set of permissions. In HBAC, a compound principal is computed having access rights that represent the intersection of the access rights of all the principals owning any code that was ever executed, whether or not that code has any influence on the security-sensitive operation that is about to be performed.

Figure 3:
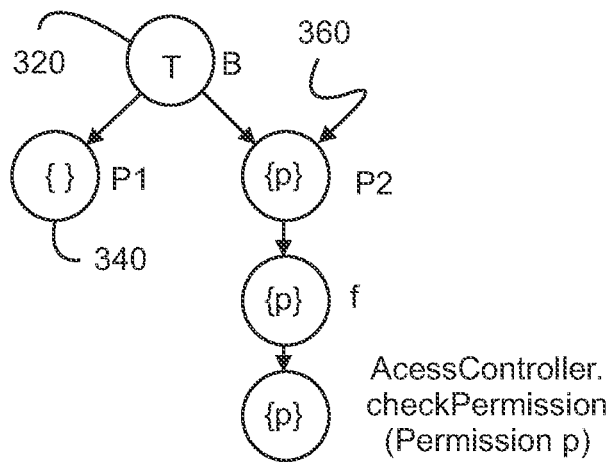
FIG. 3 is a schematic representation illustrating one problem with history based access control.
Figure 4:
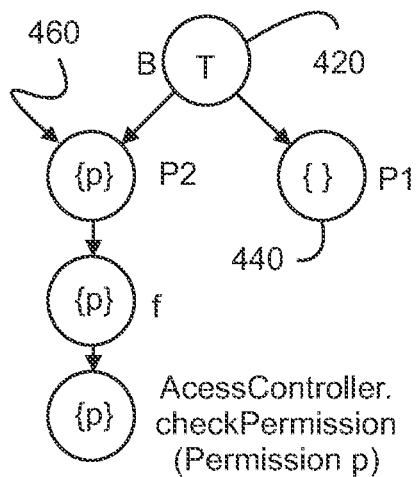
FIG. 4 is a schematic representation illustrating another problem with history based access control.

Although HBAC may be a safe alternative to SBAC, HBAC may in fact be too restrictive. As illustrated in FIG. 3, for a given principal 320 having all possible permissions, a principal 340 outside the stack of interest 360 that is not even influencing this stack will cause HBAC to reject a given call from that stack if the principal 340 outside the stack was not given a set of permissions. However, as illustrated in FIG. 4, HBAC may behave inconsistently given the timing of the given arrangement of the principals owning the executed code. As illustrated, for a similar arrangement of a principal having all possible permissions 420, a call stack 460 and a separate principal having an empty set of permissions 440, HBAC will allow the desired resource access from the call stack. This is based on the fact that the code executed by the principal with the empty set of permissions 440 is executed after the call stack. This behavior leads to inconsistent results as it may appear that the same security-sensitive action is permitted under certain situations and denied under other situations without a clear reason.

Figure 5:
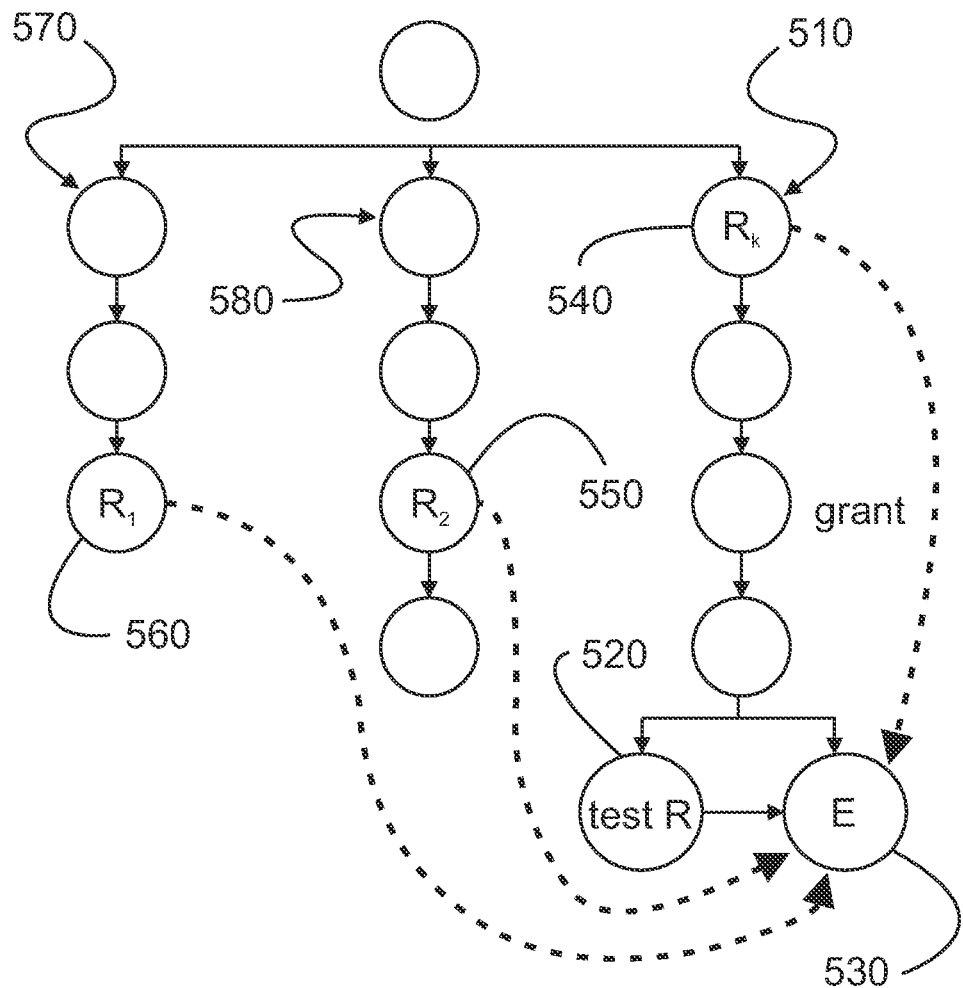
FIG. 5 is a schematic representation of an embodiment of access-control and integrity enforcement in accordance with the present invention.

Referring to FIG. 5, exemplary embodiments of systems and methods in accordance with the present invention take into account the permissions associated with all principals influencing a security-sensitive operation. Dynamic labels are attached on values and on the program counter. The values are generated by code components, and the values represent the label or set of permissions associated with that value. A given label is derived from the permissions associated with the code component, i.e., the principal, that generated that value as well as the labels associated with all values that were used by the code component to generate that value. In one embodiment, the permissions or label associated with a given value is the intersection of the permissions from the input values and the code component.

Therefore, dynamic stack inspection is augmented with tracking of information flow, and permissions are used to express integrity in the overall flow of information. For a given call stack 510 a call to the test primitive 520 for a given security-sensitive operation 530 is provided. All of the permission sets associated with all of the callers or principals in the call stack 510 up to the first grant call 540. In addition, the test primitive verifies all the labels, i.e., permission sets, on the values obtained from principles both inside and outside the call stack 540, 550, 560 that are read into the security-sensitive operation 530 that is protected or guarded by the test 520. The overall permission set R is represented as the intersection of the permission sets of all of the check permission sets or $R \subseteq R_1 \cap R_2 \cap \ldots \cap R_k$.

Since integrity uses are already guarded by calls to the access-control enforcer, systems and methods in accordance with exemplary embodiments of the present invention takes an existing access-control policy and identifies what the security-sensitive uses are by detecting the calls to the access-control enforcer. A security-sensitive action or the use of security-sensitive information is referred to as a sink, and a source is where information is generated or comes into the program. Having identified the sinks, the existing access-control policy is used to infer the intended information-flow policy. In one embodiment, a security-sensitive operation is guarded by a permission p. This is the permission demanded of the users by the resource being accessed. Any flow of information must be influenced only by principals that have been granted at least the permission p. This includes principals in the current call stack (like in stack inspection) and principals outside the current call stack.

Since the access-control enforcer only looks at the current stack of execution, exemplary embodiments of systems and methods in accordance with the present invention augment the operation of the access-control enforcer by detecting all the data-dependence and control-dependence influences on security-sensitive operations throughout the execution of the code and not only in the current call stack. A violation is reported every time an insufficiently authorized principal influences a security-sensitive operation as this will cause the intersected set of permissions to lack the demanded permission. In one embodiment, control dependencies can be optionally ignored since attacks through control dependencies are typically not easy to exploit, and accounting for control dependencies can generate a high number of false positives if enforcement is done statically. Integrity violations are reported if absence of a permission is detected in the intersected set of permissions granted to a subject influencing the security-sensitive operation.

In one embodiment, security-sensitive sinks are detected by using program analysis and identifying calls to the access-control enforcer. The access-control policy of the program, which is declaratively defined and maps principals to the security-sensitive operations granted to them, is retrieved. At run time, when a value is constructed by a code component, the permissions granted to that code component form a label that is attached to that value. When two or more values are used to define a new value, the labels of all the defining values and the label of the component defining the new value are intersected, which is possible since every label is a set of permissions, and the intersection is attached to the new value as its label. Similar rules apply to capture control dependence, where the label of the value controlling a conditional statement is used to constrain, via intersection, the label of any value defined in the code dominated by the conditional statement. As an alternative, a static enforcement is possible where value flows are tracked using program slicing.

In one exemplary embodiment, the present invention is directed to a method for enforcement of access-control and integrity policies in a computing system. The steps of this method can be performed by a user, administrator, programmer or program analyst or can be performed by one of more computers or components that are internal or external to the computing system on which an application is executed. Suitable computing systems include distributed and local computing systems containing a plurality of components that are in communication across one or more local area networks and wide area networks. Applications are run on or across one or more nodes, i.e., computers and servers, in the computing system, and these applications are expressed as software code. As these applications can make security-sensitive calls to resources within or controlled by the computing system, the integrity of the application and the ability of the application to satisfy an access-control policy within the computing system are evaluated.

The software code for an application running within the computing system is analyzed, and security-sensitive sinks in the software code for the application running on the computing system are detected. Detection of security-sensitive sinks is accomplished through program analysis on the software code, preferably the entire software code. This program analysis is preferably static program analysis that is performed on the software code and underlying libraries before the program is executed. The software code is analyzed to determine where calls to the access-control enforcer in the computing system have been inserted. The access-control enforcer enforces access-control policies in the computing system and may be located within the computing system or external to the computing system. The locations of calls to the access-control enforcer are referred to as sinks.

An access-control policy is retrieved from a database accessible to the computing system. This database can be internal or external to the computing system and can include a plurality of access-control policies. A given access-control policy maps a set of access permissions within the computing system to each one of a plurality of principals. Access-control policies are declaratively defined separately from the software code, and each access permission contains a set of security-sensitive operations within the computing system that can be granted to zero, one or more principals. A principal is an entity either internal or external to the computing system that interacts with the computer system. The identity of the principal can be verified by authentication, and the principal is granted privileges through the process of authorization. These principals include user principals, e.g., a person, machine principals, e.g., a machine having a uniform resource locator, and service principals, e.g., an executable program.

For each detected security-sensitive sink, all principals that influence that security-sensitive sink are identified. These principals are located regardless of whether the principals are located in a given stack. Each one of these principals will have an associated set of access permissions. Therefore, an overall access permission is assigned to each security-sensitive sink by taking the intersection of the access permission sets for all influencing principals of that security-sensitive sink. This overall access permission would need to contain all of permission necessary for any resource access attempted by the security-sensitive sink in the computing system. Therefore, the permissions within each overall access permission are compared to the permissions demanded by resources access by the security-sensitive sink, and an integrity violation is reported when an overall access permission for a given security-sensitive sink is insufficient to satisfy a demanded permission from a resource within the computing system.

In addition to analyzing the software code to identify overall access permission for the security-sensitive sinks, exemplary embodiments of methods in accordance with the present invention also analyze the values of variables at the security-sensitive sinks and the principals that influence these values. This can be done in conjunction with analyzing the overall access permissions of the security-sensitive sinks or as a separate, stand-alone method for enforcement of access-control and integrity policies in a computing system.

In one embodiment, variables used in the security-sensitive sinks are identified. Each variable has a value that can be influenced by one or more principals. A permission label is assigned to each value of each variable. Each permission label is a set of permissions granted to that value. Therefore as the value changes, the permission label changes. Evaluation of the variable values and assigning the permission labels occurs at run time of the software code for the application running on the computing system. Since the values of variables can be influenced by various principals, the set of permissions of each permission label is derived from the sets of permissions mapped to principals influencing the value associated with that permission label.

At run time, the values can change. Two or more values can be combined by a principal to create a new value. For example, "Good" and "Morning" can be combined to form "Good Morning" or a name can be combined with a domain to form an E-mail address. Since the permission labels are value specific, the new value is assigned a new permission label. In one embodiment, a new value is detected that was created from two or more existing values. A permission label is calculated for the new value using the intersection of the sets of permissions associated with each value used to create the new value and the principal defining the new value.

Application software code frequently makes use of conditional statements, e.g., if-then-else statements. In general, this is referred to as capture control dependence. These statements use values in both the conditional statement and in the code dominated by the conditional statement. These values can have permission labels assigned to them in accordance with the present invention. In one embodiment, the permission label for any value controlling a conditional statement is used to constrain permission labels for any value defined on the software code dominated by the conditional statement. Therefore, the permissions associated with the value controlling the conditional statement are used for the other values in the conditional statement. In addition to being conducted at run time, a static enforcement mechanism can be used to create the permission labels where value flows are tracked using program slicing.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a enforcement of access-control and integrity policies in a computing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

The invention claimed is:

1. A method for enforcement of access-control and integrity policies in a computing system, the method comprising:
   detecting security-sensitive sinks in software code for an application running on the computing system, each detected security-sensitive sink comprising at least one variable, each variable comprising a plurality of values;
   retrieving the access-control policy from a database accessible to the computing system, the access-control policy mapping a set of access permissions within the computing system to each one of a plurality of principals;
   determining, for all detected security-sensitive sinks, all influencing principals by identifying all principals located within a current call stack associated with each detected security-sensitive sink and all principals both within the current call stack and outside the current call stack from which the plurality of values are obtained that are read into the at least one variable of each detected security-sensitive sink;
   assigning a permission label to the at least one variable, each permission label comprising a set of access permissions granted to each value within the at least one variable;
   assigning an overall access permission to each detected security-sensitive-sink by taking the intersection of the set of access permissions for all influencing principals of the plurality of values of all variables of each detected security-sensitive sink; and
   reporting an integrity violation when the overall access permission for any one of the detected security-sensitive-sinks is insufficient to satisfy a demanded permission from a resource within the computing system.

2. The method of claim 1, wherein the step of detecting security-sensitive sinks further comprises using program analysis on the software code.

3. The method of claim 1, wherein the step of using program analysis further comprises using static program analysis on the software code and underlying libraries.

4. The method of claim 1, wherein the step of detecting security-sensitive sinks further comprises:
   analyzing the software code; and
   identifying calls in the software code to an access-control enforcer in the computing system.

5. The method of claim 4, wherein the access-control enforcer enforces the access-control policy.

6. The method of claim 1, wherein the access-control policy is declaratively defined separately from the software code.

7. The method of claim 1, wherein each access permission comprises a set of security-sensitive operations within the computing system that has been granted to a given principal.

8. The method of claim 1, wherein each principal comprises an entity interacting with the computer system whose identify can be verified by authentication and is granted privileges through authorization.

9. The method of claim 1 wherein the plurality of principals comprises user principals, machine principals or service principals.

10. The method of claim 1, further comprising:
    identifying the variables used in the detected security-sensitive sinks, each variable having a value that can be influenced by one or more principals.

11. The method of claim 10, wherein any of the set of access permissions of the given permission label is derived from sets of access permissions mapped to principals influencing the value associated with the given permission label.

12. The method of claim 1, wherein the step of assigning the permission label occurs at run time of the software code for the application running on the computing system.

13. The method of claim 1, further comprising:
    detecting a new value created from two or more existing values; and
    calculating a new permission label for the new value using the intersection of existing sets of permissions associated with each existing value used to create the new value and a given principal defining the new value.

14. The method of claim 1, wherein the step of assigning the permission label further comprises using the assigned permission label for any given value controlling a conditional statement to constrain other permission labels for any other value defined on the software code dominated by the conditional statement.

15. A method for enforcement of access-control and integrity policies in a computing system, the method comprising:
    detecting security-sensitive sinks in software code for an application running on the computing system;
    retrieving the access-control policy from a database accessible to the computing system, the access-control policy mapping a set of access permissions within the computing system to each one of a plurality of principals;
    identifying variables used in the security-sensitive sinks and originating from principals located both within a current call stack associated with each sink and outside the call stack, each variable having a value obtained from one of the principals;
    assigning a permission label to each value of each variable, each assigned permission label comprising a set of permissions granted to that value; and
    using assigned permission labels to make access control decisions for the security-sensitive sinks within the computing system.

16. The method of claim 15, wherein the step of assigning each permission label occurs at run time of the software code for the application running on the computing system.

17. The method of claim 15, wherein a given set of permissions of a given permission label is derived from sets of permissions mapped to principals influencing the value associated with the given permission label.

18. The method of claim 15, further comprising:
    detecting a new value created from two or more existing values; and
    calculating a new permission label for the new value using the intersection of existing sets of permissions associated with each existing value used to create the new value and a given principal defining the new value.

19. The method of claim 15, wherein the step of assigning the permission label further comprises using the assigned permission label for any given value controlling a conditional statement to constrain other permission labels for any other value defined on the software code dominated by the conditional statement.

20. A nontransitory computer-readable medium containing a computer-readable code that when read by a computer causes the computer to perform a method for enforcement of access-control and integrity policies in a computing system, the method comprising:
   detecting security-sensitive sinks in software code for an application running on the computing system, each detected security-sensitive sink comprising at least one variable, each variable comprising a plurality of values;
   retrieving the access-control policy from a database accessible to the computing system, the access-control policy mapping a set of access permissions within the computing system to each one of a plurality of principals;
   determining, for all detected security-sensitive sinks, all influencing principals by identifying all principals located within a current call stack associated with each detected security-sensitive sink and all principals both within the current call stack and outside the current call stack from which the plurality of values are obtained that are read into the at least one variable of each detected security-sensitive sink;
   assigning a permission label to the at least one variable, each permission label comprising a set of access permissions granted to each value within the at least one variable;
   assigning an overall access permission to each detected security-sensitive-sink by taking the intersection of the set of access permissions for all influencing principals of the plurality of values of all variables of each detected security-sensitive sink; and
   reporting an integrity violation when the overall access permission for any one of the detected security-sensitive-sinks is insufficient to satisfy a demanded permission from a resource within the computing system.

21. The nontransitory computer-readable medium of claim 20, wherein the step of detecting security-sensitive sinks further comprises:
   analyzing the software code; and
   identifying calls in the software code to an access-control enforcer in the computing system.

22. The nontransitory computer-readable medium of claim 20, wherein the method further comprises:
   identifying variables used in the detected security-sensitive sinks, each variable having a value that can be influenced by one or more principals.

23. The nontransitory computer-readable medium of claim 22, wherein any of the set of access permissions of the given permission label is derived from sets of access permissions mapped to principals influencing the value associated with the given permission label.

24. A nontransitory computer-readable medium containing a computer-readable code that when read by a computer causes the computer to perform a method for enforcement of access-control and integrity policies in a computing system, the method comprising:
   detecting security-sensitive sinks in software code for an application running on the computing system;
   retrieving the access-control policy from a database accessible to the computing system, the access-control policy mapping a set of access permissions within the computing system to each one of a plurality of principals;
   identifying variables used in the security-sensitive sinks and originating from principals located both within a current call stack associated with each sink and outside the call stack, each variable having a value obtained from one of the principals;
   assigning a permission label to each value of each variable, each assigned permission label comprising a set of permissions granted to that value; and
   using assigned permission labels to make access control decisions for the security-sensitive sinks within the computing system.

25. The nontransitory computer-readable medium of claim 24, wherein the method further comprises:
   detecting a new value created from two or more existing values; and
   calculating a new permission label for the new value using the intersection of existing sets of permissions associated with each existing value used to create the new value and a given principal defining the new value.

* * * * *